Jan. 13, 1959
H. CARLETON
2,868,611
IMPACT ACCELEROMETER
Filed March 23, 1956
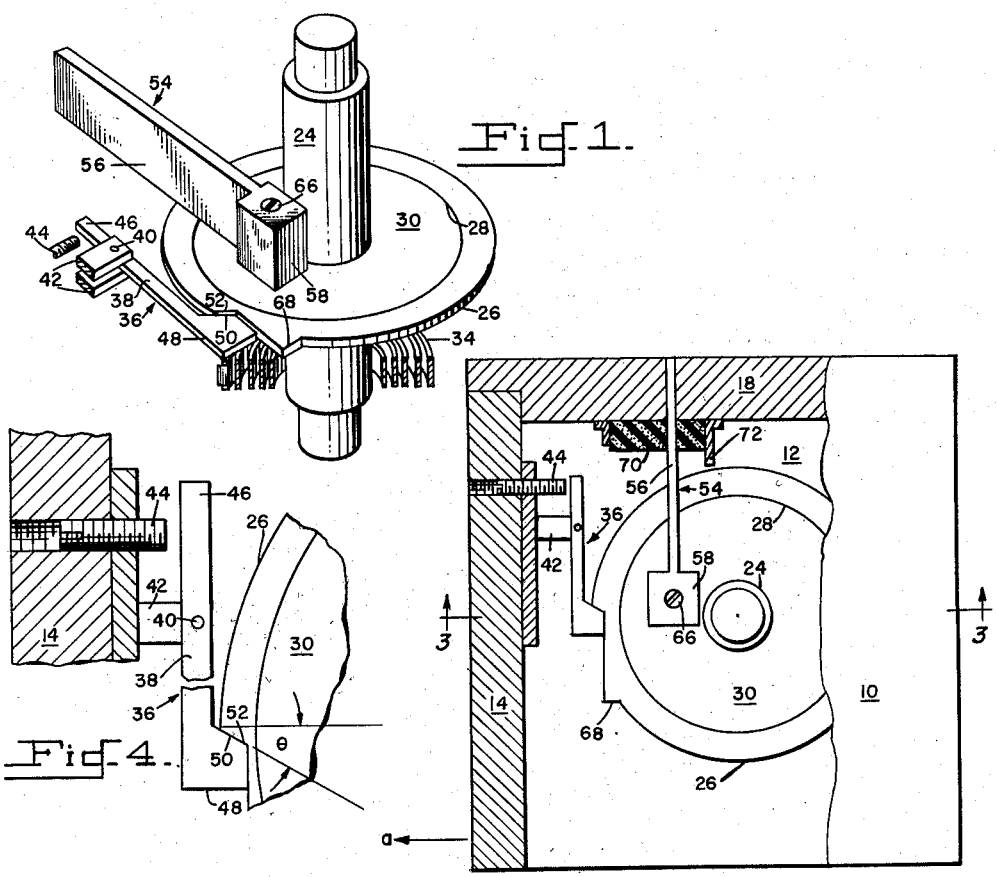
INVENTOR
*Henry Carleton*
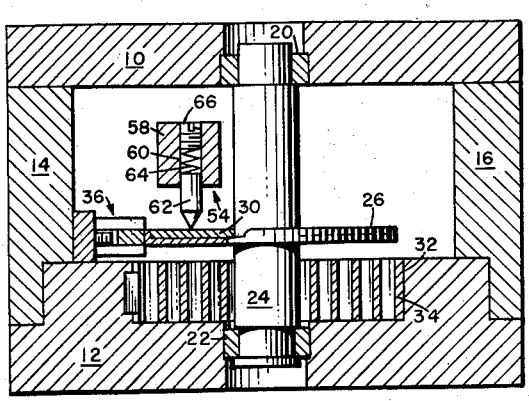
BY
*W. E. Thibodeau, A. W. Lew & J. P. Edgerton*
ATTORNEYS.

United States Patent Office 2,868,611
Patented Jan. 13, 1959

2,868,611

IMPACT ACCELEROMETER

Henry Carleton, Silver Spring, Md.

Application March 23, 1956, Serial No. 573,572

1 Claim. (Cl. 346—7)

(Granted under Title 35, U. S. Code (1952), sec. 266)

The invention described herein may be manufactured and used by or for the Government for governmental purposes without payment to me of any royalty thereon.

This invention relates to the measurement and recording of high orders of acceleration such as occur when a fast-moving object impacts against a stationary object.

There is need for measuring and recording the magnitude and time of acceleration in certain phenomena, such as when an aircraft crashes, or a projectile is fired from a gun, or a projectile strikes its target. Difficulties in this measurement and recordation are: the high order of acceleration encountered, partial destruction of the vehicle, and space limitations.

I have invented an acceleration recorder which can be placed in a projectile and which is initiated by the impact it records. Principal elements of my recorder are a spring-powered recording disc and a cantilever-mounted stylus. The recording disc is held by a latch which is released when the vehicle accelerates.

An object of this invention is to measure and record high order acceleration.

Another object is to do this by a device contained within the vehicle, the acceleration of which initiates the recordation.

Further objects are to achieve the above with a device that is sturdy, simple and reliable, yet cheap and easy to manufacture.

Other objects, aspects, uses and advantages of the invention will become apparent from the following description and the accompanying drawing, in which:

Fig. 1 is a perspective view of a device in accordance with this invention without the frame and with the spring partially broken away.

Fig. 2 is a plan view of the device partially broken away.

Fig. 3 is an axial section of the device taken along line 3—3 of Fig. 2.

Fig. 4 is an enlarged plan view of the latch portion of Fig. 2.

An embodiment of this invention is shown in the drawings wherein the frame consists of a top plate 10, base plate 12, side walls 14 and 16, and back wall 18. Centrally located in the top and base plates 10 and 12 are bearings 20 and 22, respectively. Journaled at each end, in these bearings, is shaft 24. Integral with this shaft is a disc 26 which has a recess 28 within which is an indicating washer 30. Base plate 12 has a recess 32, within which is attached a spiral or coil spring 34. The other end of the spring is attached to the shaft 24.

Attached to side wall 14 is an acceleration-sensitive lock 36 which includes arm 38 pivoted intermediate its ends about pin 40 parallel to shaft 24. The pin 40 is in projections 42 attached to the side wall 14. Magnet 44 is mounted for adjustment in side wall 14 adjacent a short end 46 of arm 38. Long end 48 of arm 38 has a projecting cam surface 50 which mates with a similar surface 52 in disc 26. These surfaces are not radial but are disposed at an angle to a radius. This angle $\theta$ is slightly greater than the friction angle.

The acceleration-measuring element 54 includes a "reed" or cantilever spring 56 attached at one end to back wall 18. At the other end of cantilever 56 is a weight 58. Bore 60, the axis of which is parallel to shaft 24, extends through the weight. Within this bore is a stylus 62, spring 64 and screw 66 arranged so that the stylus is pressed by the spring against the indicating washer 30. This washer is made of wax, or a soft metal, or a metal covered with paint so that it receives an impression from the stylus 62.

The first step of the operation is to wind the spring 34 by rotating the disc 26 by hand. The magnetic forces of magnet 44 acting through arm 38 will hold the disc in place once wound. The magnet is adjusted for the threshold of acceleration desired. That is, if it is moved close to short end 46, the disc will not start to rotate until very high acceleration is encountered; however, if the magnet is far from the short end, the disc will be freed when high accelerations are encountered. Then the device is mounted in the projectile or other vehicle so that it will be traveling in the direction of arrow $a$.

When the vehicle impacts, the inertia moves arm 38 away from disc 26. The spring 34, through the camming action of surfaces 50 and 52, aids this release so that it is very rapid. As soon as arm 38 moves slightly, the magnetic force is small, and then disc 26 starts to rotate. Although the angular velocity of disc 26 is not constant, this can be considered in interpretation of the record made by the stylus 62 on washer 30. The weight 58 causes deflection of cantilever 56 proportional to the acceleration encountered. After about 270° of rotation, the disc is stopped by projection 68 on disc 26 contacting lug 72; or some other projection suitably located.

For some applications it might be desirable to use two recording styluses on either half of the disc. Then it would be necessary to stop the disc after about 160° rotation. If two styluses are used, it is possible to have one set with a natural frequency of about 400 cycles per second and a sensitivity for measuring a maximum of about 500 g.; and the other with a natural frequency of about 4000 cycles per second and a sensitivity for measuring about 5000 g.

Sponge rubber blocks 70 are placed around the cantilever 56 to dampen vibrations.

It will be apparent that the embodiments shown are only exemplary and that various modifications can be made in construction and arrangement within the scope of the invention as defined in the appended claim.

I claim:

An acceleration measuring device comprising in combination: a frame consisting of top and base plates, first and second side walls, and a back wall, said device being arranged so that the acceleration applied thereto is perpendicular to said side walls and in a direction from said second side wall to said first side wall; first and second bearings centrally located in said top and base plates, respectively; a shaft perpendicular to said top and base plates with its end journaled in said bearings; a disc integral with said shaft; an indicating washer made of soft metal centrally located within a recess in said disc; a spring centrally located within a recess in said base plate, said spring surrounding said shaft with one end of said spring attached to said base plate and the other end attached to said shaft, said spring being adapted to be wound by rotation of said disc; an acceleration-sensitive lock holding said disc against the rotational forces exerted by said spring when wound, said lock comprising a pair of parallel projections attached to said first side wall opposite said disc, a pin mounted in said projections with its axis parallel to said shaft, an arm pivoted intermediate its ends about said pin so as to divide said arm into a relatively long end portion and a relatively short end portion, said long end portion of said arm having a projecting cam surface adapted to mate with a matching surface on the periphery of said disc when said disc is in a position such that said spring is wound, said surfaces being disposed at an angle to a radius of said disc, said angle being slightly greater than the friction angle, and a magnet mounted for adjustment in said first side wall adjacent said short end portion of said arm, said magnet being so constructed and arranged in cooperation with said arm that the magnetic forces of said magnet acting through said arm locks said disc in place against the forces of the wound spring until said device experiences a predetermined amount of acceleration, the axis of said arm being in a position substantially perpendicular to the direction of applied acceleration until said device experiences said predetermined amount of acceleration which thereupon causes said large end portion of said arm to swing away from said disc, thereby unlocking said disc for rotation by the wound spring; and an acceleration-measuring element including a cantilever spring having its flat side in a plane which is substantially perpendicular both to said disc and the direction of the applied acceleration, one end of said cantilever spring being attached to said back wall, a weight to which the other end of said cantilever spring is attached, said weight having a bore extending therethrough in a direction parallel to said shaft, a stylus in said bore, and a spring and a screw also in said bore arranged so that said stylus is pressed by said spring against said indicating washer, said weight being located in cooperation with said cantilever spring so that said stylus moves substantially radially away from said shaft under the influence of the applied acceleration; the unlocking of said disc when said device experiences said predetermined amount of acceleration causing said first mentioned spring to rotate said disc while said stylus moves radially under the influence of the applied acceleration to mark a permanent record on said soft metal indicating washer.

References Cited in the file of this patent
UNITED STATES PATENTS

| | | |
|---|---|---|
| 2,495,340 | Milster | Jan. 24, 1950 |
| 2,695,211 | Guttwein et al. | Nov. 23, 1954 |

FOREIGN PATENTS

| | | |
|---|---|---|
| 195,759 | Great Britain | Apr. 9, 1923 |
| 709,472 | France | May 18, 1931 |